United States Patent
Verdol et al.

[15] 3,674,743
[45] July 4, 1972

[54] ELASTOMERS FROM POLYHYDROXY POLYDIENES

[72] Inventors: Joseph A. Verdol, White Plains, N.Y.; Patrick W. Ryan, Glen Mills, Pa.

[73] Assignee: Atlantic Richfield Company, New York, N.Y.

[22] Filed: May 15, 1970

[21] Appl. No.: 37,884

Related U.S. Application Data

[63] Continuation of Ser. No. 525,369, Feb. 7, 1966, and a continuation-in-part of Ser. No. 797,347, Jan. 23, 1969, which is a continuation of Ser. No. 536,301, March 22, 1966, abandoned, which is a continuation-in-part of Ser. No. 465,161, June 18, 1965, abandoned.

[30] Foreign Application Priority Data

Aug. 9, 1965 Canada....................................937,689

[52] U.S. Cl.........................260/73 L, 260/2 P, 260/2.5 AM, 260/46.5 UA, 260/47 EP, 260/47 UA, 260/58, 260/75 A, 260/75 R, 260/77.5 CR, 260/859 R
[51] Int. Cl.......................................C08q 22/08, C08q 22/16
[58] Field of Search...................260/77.5 CR, 859, 75, 75 A, 260/46.5 U, 2 P, 58, 47 EP, 47 U, 2.5 AM, 73 L

[56] References Cited

UNITED STATES PATENTS 2,877,212   4/1959   Seligman.......................260/77.5 CR Primary Examiner—Donald E. Czaja
Assistant Examiner—M. J. Welsh
Attorney—Morton, Bernard, Brown, Roberts and Sutherland

[57] ABSTRACT

A self-curing solid elastomer is made by reaction of a polyfunctional compound with a polyhydroxyl polymer having at least 2.1 predominantly primary, terminal, allylic hydroxyl groups per molecule, the polymer being made from 1,3-diene and 0 to 75 percent of alpha-monoolefin. The polyhydroxyl polymer has a Brookfield viscosity at 30° C. of about 5 to 20,000 poises and a number average molecular weight of about 400 to 25,000. The polyhydroxyl polymer can have about 40 to 70 percent trans-1,4-unsaturation and about 10 to 30 percent cis-1,4-unsaturation. Suitable polyfunctional compounds reactive with the polyhydroxyl polymer include the polyisocyanates whose reaction results in the formation of urethane linkages.

26 Claims, No Drawings

ELASTOMERS FROM POLYHYDROXY POLYDIENES

This application is a continuation of application, Ser. No. 525,369, filed Feb. 7, 1966, and is a continuation-in-part of application Ser. No. 797,347, filed Jan. 23, 1969 which in turn is a continuation of application Ser. No. 536,301 filed Mar. 22, 1966, now abandoned which in turn is a continuation-in-part of application Ser. No. 465,161, filed June 18, 1965, now abandoned.

This invention relates to novel "chain-extended" solid, elastomeric, polymers having self-curing properties and made by chain extending certain liquid or semi-solid diene addition polymers. These chain-extended elastomers are useful in vehicle tires, rubber floor tile, binders for rocket propellants, coatings for pipes, tanks, etc. and scores of other applications. These elastomers can be made by a procedure which is simple and in a number of ways more convenient than art-known methods for producing solid elastomers.

The polymers of this invention have advantages not found in materials known to the art. For example, known elastomers are generally divisable into two types: those derived from high molecular weight solid polydiene resins, which generally have superior elastic and friction properties and those of the urethane type which are of reduced elastic properties and often of poor friction characteristics, but having greater tear resistance and strength. Preferred elastomers of this invention provide the good qualities of both these types of elastomer. The elastomers of this invention can be prepared at ambient temperatures and thus find utility in the casting of heat-sensitive articles; for example, they are of use as binders for solid fuels. The elastomers of this invention have improved elastic properties attributable to their novel structure, in particular the location of the carbon-to-carbon bonds of the linear chains. The polymers of this invention have manufacturing advantages not known to the art. Known elastomeric products are usually addition polymers of molecular weight sufficiently high to give solid resinous materials at ambient temperatures. Fabrication of articles from such resins usually requires heating the resin to a flowable state and extrusion or casting in a flowable state to produce finished elastic and impact resistant articles. In the thermoplastic state these resins may be mixed with vulcanizing agents to produce solid products by extrusion or molding and cooling. In this invention, the novel elastomers may be made by casting from a liquid diene-containing reaction mixture at more-or-less ambient temperature and allowing the resulting chain-extended polymer to cure to form a solid, including a foamed, elastomer. The polymer compositions of this invention can also be made by molding or extruding the intermediate chain-extended polymer, often at ambient temperatures, to the desired final form and subsequently allowing the elastomer to cure.

The novel polymers of this invention comprise the residues of a diene polyhydroxy first intermediate polymer having at least 2.1 predominantly primary, allylic, terminal, i.e., attached to a terminal carbon atom, hydroxyl groups per polymer molecule on the average. Most advantageously, the intermediate polymer has greater than 2.1 average terminal hydroxyl groups, e.g., at least 2.2 to, say, 2.6 or even 3 or more. Also, two terminal hydroxyls are generally separated by a long carbon-carbon chain. The polydiene which appears as a residue in the composition of this invention differs from the homopolymers and copolymers of butadiene and related dienes which are commercially available as GR-S rubber, etc. The intermediate polymer of this invention may have a viscosity at 30° C. of about 5–20,000 poises, preferably about 15 to 5,000 poises. Often the intermediate polymer, when a homopolymer, is obtained in a viscosity range of about 20 to 300 or 500 poises at 30° C. Preferred homopolymers have a viscosity of about 35 to 60 poises or about 190 to 260 poises at 30° C. Thus, the first intermediate polymers are essentially liquids, including semi-solids flowable under moderate pressure, at ambient temperatures or at temperatures in the range of −100° to 400° F., which enables them to be readily mixed with chain-extending agents and, still in the liquid form, be cast into molds or otherwise shaped and cured. The hydroxyl-containing intermediate diene polymers used in the present invention will have number average molecular weights in the range of about 400 to about 25,000 as determined by cryoscopic, ebullioscopic or osmometric methods. The preferred hydroxyl-containing diene homopolymers and copolymers will be in the molecular weight range of about 900 to 10,000. In contrast, conventional diene polymers such as GR-S rubber are extremely high in molecular weight, e.g., in the range of several hundred thousand and are, therefore, rubberlike materials which are not useful as the intermediate polymer in the preparation of the self-curing elastomers of the present invention. The latter diene polymers are too high in molecular weight to be worked at ambient temperatures and are not chain-extendible, self-curing, etc.

The diene polymers which are used in this invention have primary hydroxyl groups which are allylic in configuration, thereby being of a more reactive nature in the chain-extension reaction. The preferred diene partial polymer also has the majority of its unsaturation in the main hydrocarbon chain, providing polymers of improved elasticity characteristics. Also, it has been found that the high trans-1,4-unsaturation of many of the useable diene intermediate polymers gives urethane rubbers which appear to crystallize on stretching in a manner reminiscent of natural rubbers. The presence of more than two hydroxyls in the polymer molecule provides self-curing without the need to employ extraneous cross-linking agents.

The dienes which are employed to make the first intermediate polymers are unsubstituted, 2-substituted or 3,3-disubstituted 1,3-dienes of up to about 12 carbon atoms. The diene preferably has up to six carbon atoms and the substituents in the 2- and/or 3-position may be hydrogen, alkyl, generally lower alkyl, e.g., of one to four carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc. The choice of diene will usually depend upon properties desired in the final elastomer resin; for example, chloroprene may be used, alone or in admixture with other dienes to produce oil-resistant and flame-proof rubbers.

The hydroxyl-terminated diene homopolymer and copolymer first intermediate polymers of greatest utility in accordance with the present invention, have been found to have primary hydroxyl groups in terminal allylic positions on the main, generally longest, hydrocarbon chain of the molecule. By "allylic" configuration is meant the alpha-allylic grouping of allylic alcohol, that is, the terminal hydroxyls of the first intermediate polymer are attached to a carbon adjacent to a double-bond carbon.

The number and location of the hydroxyl groups and the molecular weight of the liquid intermediate polymer are for the most part a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100°–200° C., preferably about 100°–150° C.

The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having two to about 12 carbon atoms. The $H_2O_2$-solvent system is found to supply hydroxyl groups and the catalytic and solvent affects needed to produce the first intermediate diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer.

Saturated alcohols are preferred and often those having about the same carbon atom content as the diene monomer will be found most useful. Thus propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 10 percent of the reaction mixture to assure a low molecular weight addition polymer product having more than about two hydroxyl groups per molecule.

The usable liquid (including semi-solid, etc.) first intermediate polymers of butadiene will preferably conform to the following simplified chemical structure:

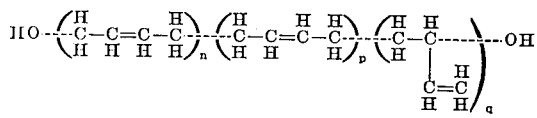

in which $n$ plus $p$ is greater than $q$, that is, the in-chain unsaturation accounts for more than 50 percent of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may represent a number sufficient to give a cis-1,4-unsaturation content of about 10–30 percent, $p$ may be a number sufficient to gibe a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing polydiolefins having the predominating trans-1,4-structure, although such are highly preferred, where otherwise suitable polymers having high cis-1,4 forms are available.

Olefinically unsaturated monomers may be incorporated into the diene first intermediate polymer products used in this invention and these may often be components which provide cross-linking sites. Usable monomers include alpha-mono olefinic materials of about two or three to 10 or 12 carbon atoms such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of mono olefinic monomer employed will often be determined on the basis of properties desired in the final elastomer resin. For example, solvent-resistant rubbers may be formulated by copolymerization of butadiene with acrylonitrile, or other monoolefin, substituted with a non-hydrocarbon radical, to produce the first intermediate polymer. Generally the amount of monoolefinic monomer in the polymer will be about 0–75 percent by weight of the total addition polymer, preferably about 1 to 40 percent, or even about 10–40 percent.

In addition to the homopolymers and copolymers comprised of single dienes and single monoolefinic monomers, the present invention may also use polymers made from combinations of a plurality of dienes and monoolefinic monomers. For example, mixtures of butadiene, isoprene and styrene can be polymerized to afford low molecular weight hydroxyl-containing interpolymers. Various combinations of dienes and monoolefinic monomers may be copolymerized to produce hydroxyl-containing copolymers or interpolymers which may be used to form self-curing elastomers. Also, the polymer materials used in this invention may be given improved oxidation and ozone resistance by hydrogenating the hydroxyl-containing diene homopolymers and/or interpolymers to their corresponding more-saturated derivatives. Usually the hydroxyl-containing diene homopolymers and copolymers used in the present invention will at most be only partially hydrogenated, so as to provide a material which is more stable due to diminished unsaturation but which still has good elastomer properties.

The chain-extending reaction is usually a condensation polymerization, by which is meant a reaction for joining monomer molecules distinct from addition polymerization which involves reaction at a double carbon-to-carbon bond. In condensation polymers the monomers are joined usually by oxygen and/nitrogen atoms and often the polymerization reaction involves the elimination of another molecule such as water, $CO_2$, $NH_3$, etc., between monomer molecules.

The condensing or chain-extending reagents which may be employed for reaction and chain extension of the hydroxyl-containing polyolefin homopolymers and copolymers include most polyfunctional organic or inorganic materials which are capable of reacting with hydroxyl groups without destroying the basic polymer structure. These materials include di- and polyisocyanates, di- and polybasic acids, chlorides and anhydrides, diols and polyols and polyol derivatives such as methyl trichlorosilane, methylol urea-formaldehyde compositions, resol types of phenol and modified phenol-formaldehyde materials, di- and tris(aziridinyl)phosphine oxides, dichloro, trichloro, etc. silanes such as dimethyl dichloro silane, methyl trichloro silane. Certain inorganic reagents, especially phosphorus oxychloride or phenyl phosphorous dichloride and the like are suitable chain-extending agents and have the added advantage of imparting flame-proof properties to the elastomers. Insofar as dibasic or polybasic organic acids and acid chlorides are concerned, phosgene, oxalyl chloride, adipoyl chloride, adipic acid, dimethyl adipate and related materials are useful for producing chain-extended elastomers of the present invention. Polyepoxides such as the diepoxides produced by the reaction of bisphenol A (para, para'-isopropylidene-diphenol) and epichlorohydrin (known commercially as Epon resins) are also useful for chain-extending the hydroxyl-containing low molecular weight diene homopolymer and copolymers by condensation-type polymerization.

So far as the "chain-extending" reaction to produce the second intermediate polymer is concerned, chain-extending agents having two or more functional groups reactable with the hydroxyls of the first intermediate polymer will accomplish this reaction. Where chain-extending agents having three or more groups reactive with the terminal hydroxyls are used, cross-linking occurs along with the chain extension. In other situations such as where the chain-extending agent is itself a polymer resin with plural hydroxy-reactive groups the chain-extending reaction results in a cross-linked polymer without passing through an intermediate phase. Some difunctional chain-extending agents have further functional groups which can cause cross-linking among the residues of chain-extending agents. Often these linking reactions will require a change in conditions from the conditions of chain extension in order to take place.

The chain-extending agent is often used in an amount sufficient to supply about 0.1 to 10 chain-extending functional groups per OH group of the first intermediate polymer, preferably about 0.5 to 3 chain-extending functional groups are supplied for each diene polymer hydroxyl. The proportions usually approach one mole of chain-extending agent per mole of polydiene, although either of the two materials may be provided in some excess. The particular chain-extending agent to be used is selected in accordance with the properties desired in the final product. A higher molecular weight chain-extending agent will tend to have its properties dominate in the finished elastomer while a low molecular weight chain-extending agent will have its properties subordinated to the elastic, etc., properties of the diene hydrocarbon polymer.

Particularly useful polymer products according to this invention are urethane rubbers which have a spectrum of properties improved over both conventional urethane rubbers and conventional polydiene rubbers. Thus, the preferred condensing agents for the present invention are aliphatic and aromatic diisocyanates such as 2,4-tolylene diisocyanate, metaphenylene diisocyanates 2,6-tolylene diisocyanates (or mixtures of these materials), transvinylene diisocyanate, p,p'-diphenylmethane diisocyanate, and hexamethylene diisocyanate, as well as related aromatic and aliphatic isocyanates, which may also be substituted with other organic or inorganic groups that do not adversely affect the course of the chain-extending reaction. These diisocyanates can be reacted with the diene first intermediate polymers at ambient temperatures to form urethane linkages, apparently due to the increased reactivity given the hydroxyl groups by the allylic configuration. Usually about 4–10 percent toluene diisocyanate is employed in the chain-extending reaction, preferably about 5–8 percent based on the total weight of the reaction mixture.

In addition to the simple isocyanates described above, the hydroxy-containing, chain-extendible diene materials can be condensed with isocyanate-terminated polyethers or polyesters, etc., which are generally produced by reacting the isocyanate with, for example, polyglycols (such as polypropylene glycol) and polyesters (such as polyethylene adipate). These materials may be reacted with an excess of diisocyanate. An example of such a material is the product obtained by the reaction of one mole of propylene glycol with 2 moles of 2,4-tolylene diisocyanate as shown below:

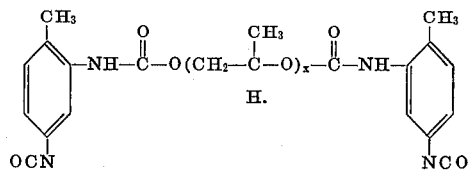

Isocyanate-terminated polyether

Isocyanates are of particular advantage in this invention in that they provide second intermediate polymers of greater and easier self-curing properties. Polyisocyanates such as the materials sold commercially as PAPI (polyarylene polyisocyanate) of the following structure:

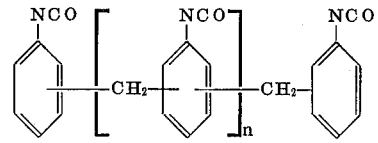

can also be employed.

The conditions for the condensation polymerization or "chain extension" may vary, depending upon the chain-extending agents employed. With the preferred agents, arylene diisocyanates such as tolylene 2,4- and 2,6-diisocyanates, the chain-extending reactions may be carried out conveniently at ambient temperatures. which may require from 1 hour to several days, depending upon whether or not catalysts are employed in the reaction. Temperatures below ambient may also be employed. Elevated temperatures enhance cross-linking of the isocyanate-extended hydroxyl terminated diene polymers. Thus, after chain-extending at ambient temperatures the temperature may be raised to up to about 200° C. or both chain-extension and cross-linking may be obtained simultaneously at these higher temperatures. Thus, isocyanate reactions are generally conducted at temperatures of about 50°–150° C.

When chain-extending the low molecular weight hydroxyl-containing diene homopolymers or copolymers by condensation reactions involving reaction with dibasic acids, or esters, it is generally desirable to carry out the reaction at temperatures of at least 100° C. and up to 200° C., in the presence of a basic or acidic catalyst. Chain-extending reactions with organic acid and inorganic acid chlorides such as phosgene, oxalylchloride, phosphorus chlorides, silicon chloride, titanium chlorides and the like may be carried out at ambient temperatures up to about 150° C. Generally the reaction mixture with acid chlorides in solution chain extension may be held at up to about 50° C. until HCl evolution ceases. These reaction conditions can also be used when silanes such as dimethyl dichlorosilane is used as the chain-extending agent.

Chain extension and cross-linking with phenol formaldehyde polymers, butylated phenol formaldehyde polymers, and hydroxyl-containing melamine-formaldehyde or urea formaldehyde polymers are normally carried out at elevated temperatures, such as 100°–200° C. or greater if necessary, although some reactions occur in the range of 50°–100° C. Many of these reactions require the use of alkaline or acid catalysts, such as $H_3PO_4$, xylene sulfonic acid, sodium acetate, etc. Aziridinyl phosphine oxide usually reacts best in chain extension at room temperature to about 70° C. using an acidic catalyst while diepoxides may be reacted in the same temperature range using a basic catalyst. The chain extension reaction is preferably performed under bulk polymerization conditions but may also take place dispersed in a non-reactive liquid medium. Advantageously this medium will be one which dissolves both the diene first intermediate polymer and the chain-extending agent, at least to some extent.

Certain other hydroxyl containing materials may be incorporated with the allyl-hydroxyl diene partial polymer fed to the reaction, the individual hydroxyls being linked together, with diisocyanates or other chain-extending agents. For example, a hydroxyl-containing first intermediate polybutadiene may be mixed with materials such as polypropylene glycol, polyethylene glycol, interpolymers of polyethylene and polypropylene oxides, and hydroxy-terminated polyesters which are normally employed to make conventional urethane rubber. In such cases polymers are formed which have polybutadiene moities linked through chain-extension at the hydroxy residues to saturated glycol, polyolefin, polyether or polyester moieties. The polybutadiene glycol as well as the other glycols may appear in chain-extended blocks in the final polymer product. For example, when a low molecular weight hydroxyl-containing polybutadiene is reacted with a diisocyanate, such as 2,4-tolylene diisocyanate, a polyolefin-polyurethane elastomer of the simplified following structure results:

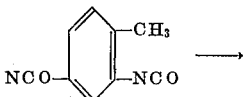
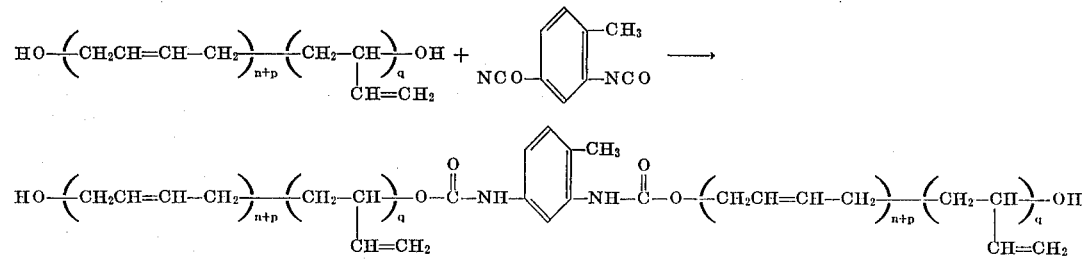
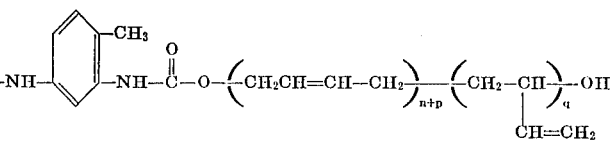

or

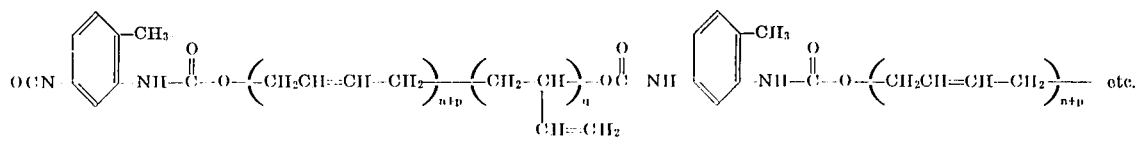

As shown above, the resulting high molecular weight polydiene-polyurethane elastomer may be either hydroxyl terminated, isocyanate terminated, or both, depending upon reaction conditions or the ratio of diisocyanate to hydroxyl-containing polydiene employed in the condensation polymerization. It also will be observed that the chain-extended polymer provides amino nitrogen having replaceable hydrogen. Typical reactions and reagents for self-curing second intermediate polymer production are illustrated below:

polymer to promote cross-linking. Generally, amounts of vulcanizing agents common to the art can be herein employed, as well as conventional vulcanization temperatures. The tailor-making of block urethane polymers composed of varying amounts of diene blocks and diene-vinyl blocks, as well as polyether and/or polyester blocks, enables one to randomly blend or co-react conventional polyether-polyurethane and polyester-polyurethane elastomers with the second intermediate polymers. Furthermore, the diene-urethane polymers or other chain-extended polymers (including the diene-

*Polyolefin-polyether-urethane rubber*

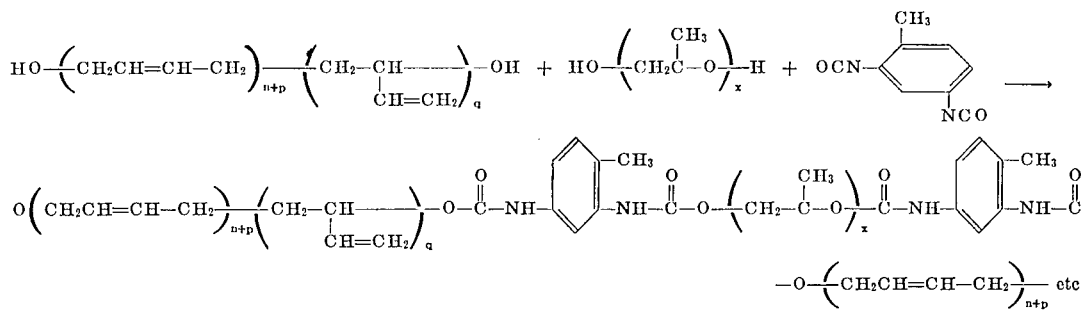

*Polyolefin-polyester-urethane rubber*

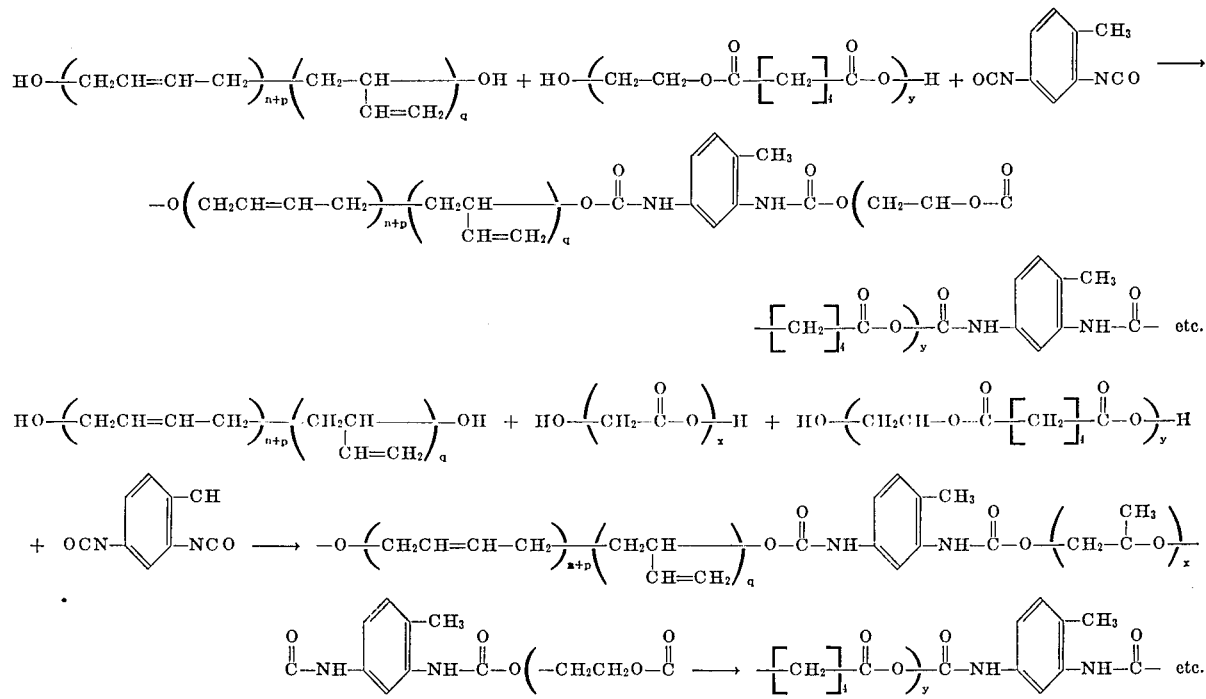

Cross-linking of proximate chains of the second intermediate polymer may, if desired, be brought about through the polydiene residues, the chain-extending agent residues, or both. For example, gamma radiation, common vulcanization agents, etc., may be employed to bring about cross-linking at the double bonds of polydiene residues in adjacent second intermediate polymer molecules. Sulfur used as sulfur, thiuram derivatives and other materials conventionally employed to vulcanize natural rubber, GRS rubber, and related synthetic polyolefin rubbers may thus be added to the chain-extended polyether-polyester-urethane block polymers) may be blended for co-vulcanization with conventional diene rubbers such as natural polyisoprene, GR-S rubber, GR-N rubber, Neoprene rubber. In essence, the present invention makes possible the production of self-curing urethane rubbers which can be made compatible with and cross linked with practically all types of synthetic and natural rubbers presently produced. Thioplast materials containing a plurality of sulfur linkages can also be co-blended and co-cured in a similar fashion. It should be pointed out that the finished elastomer still usually contains an abundance of olefinic unsaturation, which apparently enables the products of this invention to be loaded with carbon black to an extent comparable to butadiene and natural rubber and to a far greater extent than known urethane rubbers.

The elastomers of this invention may be provided in the foamed form, in which case a blowing agent is incorporated in the mixture before chain extension or before allowing the second intermediate polymer to cure. The foaming agent may be admixed with the hydroxyl-containing, low molecular weight diene homopolymer or copolymer which is then subjected to temperature and pressure conditions needed for chain-extending condensation polymerization and/or curing and release of the blowing agent at the optimum time for entrapment in the polymer, whether the addition polymer only or the second intermediate condensation polymerization product, of proper viscosity to entrap the gaseous foaming agent. The foaming agents which may be employed are water, gaseous nitrogen, carbon dioxide, chloro- and fluoromethanes known as Ganetrons, low boiling hydrocarbons, as well as conventional chemical blowing agents which are capable of liberating carbon dioxide or nitrogen under the temperature conditions employed for preparing the foamed elastomers.

To prepare high impact plastics, homopolymers or interpolymers of dienes and vinyl monomers such as butadiene-styrene, butadiene-acrylonitrile, butadiene-styrene-acrylonitrile, can be prepared by polymerization to low molecular weight, hydroxy-terminate, polymers. These polymers may then be mixed with other hydroxy terminated polymers in any selected proportion and chain-extended with diisocyanates, formaldehyde, acid chlorides and other chain-extending agents, to form second intermediate polymers which can cure to tailor-made, high-impact block polymers. As mentioned, diepoxides, dianhydrides, carboxylic acids, acid chlorides (organic and inorganic), phenol formaldehyde polymers, melamine formaldehyde polymers and other polyfunctional reagents capable of reacting with the hydroxyl groups of the polybutadiene (or other diene polymers) may be employed as the condensing agent.

An alternate method of preparing high impact plastics involves blending the hydroxyl-containing diene polymers or interpolymers with conventional low impact plastics, and allowing the product to cure after extrusion, molding, vacuum forming, etc. The chain-extending agents may be blended with the hydroxyl-containing low molecular weight diene polymer or copolymer prior to combining the latter with the other low impact materials, or may be blended during extrusion, etc., of the mixture.

Another technique for preparing high-impact plastics of the acrylonitrile-butadiene-styrene type, or related type, involves homopolymerizing or copolymerizing butadiene, styrene, acrylonitrile, acrylic esters, etc. in various combinations to form relatively low molecular weight hydroxyl-containing polymers, which are subsequently extended in molecular weight with condensation polymerizers such as diisocyanates, diepoxides, formaldehyde, etc., subsequently blended with polystyrene or conventional styrene copolymers and allowed to cure. Monomeric polyols can also be employed with the chain-extendable, hydroxy-containing diene polymers or copolymers, to afford products containing varying degrees of elasticity. For example, a hydroxy-containing polybutadiene can be admixed with polypropylene glycol and trimethylol propane, followed by chain extension of the entire mixture with tolylene diisocyanate or other suitable chain-extending agent. In other cases, the hydroxyl-containing diene homopolymers and copolymers can be mixed with simple glycols as propylene glycol, dipropylene glycol, neopontyl glycol and the mixture then chain-extended to afford self-curing diene-containing polyurethane elastomer compositions.

If it is desirable to enhance the oxidation of ozone resistance of the polyolefin-polyurethane rubbers of the present invention, the hydroxyl-containing, low molecular weight, polybutadienes may be hydrogenated, as mentioned, prior to their reaction with isocyanates or other chain-extending agents.

Solid fillers, general or special purpose rubbers, other resins or plasticizers, extender oils, etc., may be incorporated into the urethane elastomers of this invention, preferably by inclusion of these materials in the chain-extension reaction mixture although they may be incorporated during or subsequent to curing. Solids often may be added to the polydiene intermediate polymer as a solution, suspension or slurry in extender oil.

It may be desired to include an antioxidant in the polymer formulation, in which case about 0.5 to 2.0 parts, per 100 parts of polydiene polymer, of such materials as 4,4'-methylene bis(2,6-di-tert-bytylphenol), or 4,4'-methylene bis(6-tert-butyl-o-cresol), may often be used.

EXAMPLES

The following examples of the polymers and method of this invention are to be considered illustrative only and not limiting. In these examples, polybutadiene No. 45 is a polybutadiene homopolymer having a viscosity of about 50 poises at 30° C., a hydroxyl content of about 0.95 meq/gm, a hydroxyl number (mg KOH/gm) of 53, an average molecular weight of 2,200–2,500, about 2.1–2.2 terminal, allylic, hydroxyl groups (which are predominantly primary) per molecule, an an iodine number of 398. It can be prepared by polymerizing 100 parts of butadiene in the presence of 70 parts of isopropanol and 10 parts of hydrogen peroxide in an aluminum clad autoclave at 118° C. for 2 hours. Polybutadiene No. 15 is a homopolymer having a viscosity at 30° C. of about 200 poises, a hydroxyl content of 0.80 meq/gm, a hydroxyl number of 45 mg KOH/gm, an average molecular weight of 3,000–3,500, about 2.6 terminal, allylic, hydroxyl groups, which are predominantly primary, per molecule, and an iodine number of 395. It is made by polymerizing 100 parts of butadiene in the presence of 35 parts of isopropanol and 6 parts of hydrogen peroxide for 2½ hours at 120° C. Styrene copolymer No. 15 has a molecular weight of about 2,200–2,500, a viscosity at 30° C. of about 250 poises, a hydroxyl content (meq/gm) of 0.95, a hydroxyl number of 53 mg KOH/gm, about 2.2 (based on average molecular weight of 2,350) terminal, allylic, hydroxyl groups, which are predominantly primary, per molecule, and an iodine number of 335. It is made by polymerizing 75 parts butadiene and 25 parts styrene in the presence of 70 parts isopropanol and 10 parts of 50 percent hydrogen peroxide for 2½ hours at 120° C. Acrylonitrile copolymer No. 15 has a viscosity of about 550 poises at 30° C., a hydroxyl content of 0.80 meq/gm, and hydroxyl number of 45 mg KOH/gm, an average molecular weight of 2,500–3,000, about 2.2 (based on average molecular weight of 2,750) terminal, allylic hydroxyl groups, which are predominantly primary, per molecule, and an iodine number of 45. It is made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 10 percent hydrogen peroxide. The reactants are heated in an autoclave at 118° C. for 1½ hours and stripped. Mul F–66 is an isocyanate-terminated, 4,4'-diphenylmethane diisocyanate-poly(ethylene adipate) prepolymer.

EXAMPLE I

One hundred parts of polybutadiene No. 45 was mixed with 7 parts of tolylene diisocyanate (a commercial mixture of 80% 2,4-TDI and 20% 2,6-TDI) and the mixture was placed in a rubber mold and heated in a press at about 100° C. for 4 hours. A cured rubbery elastomeric material was obtained showing a tensile value of 100–150 psi. and an ultimate elongation of 350–500%.

EXAMPLE II

In a run similar to Example I, 10 parts by weight of extender oil DHN 200, a hydrogenated, non-staining petroleum-based rubber processing oil having a viscosity, SUS, of about 200 at 100° F., is added to the liquid polybutadiene homopolymer prior to addition of the tolylene diisocyanate. The mixture was cured at 100° C. for about 4 hours and showed elastomeric properties similar to those displayed by the polymer without oil. The gumstock was somewhat softer, but still retained good physical properties.

EXAMPLE III

In another run, 93 parts of hydroxyl-terminated polybutadiene No. 45 homopolymer and 7 parts of commercial tolylene diisocyanate were thoroughly mixed and de-gassed in vacuo. The castable mix was poured into a rubber mold and allowed to cure at room temperature for 3 days prior to removing the cured stock. The resulting elastomer showed an ultimate tensile strength of 100 psig, and ultimate elongation of 378 percent. This run was repeated using 20 percent of DHN 200 rubber extender oil added prior to adding the tolylene diisocyanate. The resulting mixture was then cured at 100° C. for about 4 hours. The gumstock was soft, but retained good physical properties.

EXAMPLE IV

In another run, 100 parts of the butadiene homopolymer No. 45 was blended with 30 parts of DHN 200 rubber extender oil. To this mixture was added 10 parts of carbon black. Seven parts of tolylene diisocyanate and 0.4 part of dibutyl tin dilaurate catalyst was added and the mixture was allowed to cure in a rubber mold at ambient temperature for several days. The resulting product showed excellent physical properties in comparison with an unreinforced gumstock.

EXAMPLE V

In another run, 100 parts of polybutadiene No. 45 homopolymer was diluted with 20 parts of a liquid polybutene oil Indopol H-300 having a mean molecular weight of 1,100. The resultant mixture was mixed with 7 parts of tolylene diisocyanate and allowed to cure at ambient temperature for several days. The resulting product showed good physical properties and good adhesion to metallic and wood substances.

EXAMPLE VI

In another run, 100 parts of polybutadiene No. 45 was diluted with 20 parts of the liquid polybutene Indopol H-300 and 10 parts of carbon black. Seven parts of TDI were added and the mixture permitted to cure at ambient temperature for several days. A very elastomeric substance was obtained showing good physical properties.

EXAMPLE VII

In another run, 94 parts of hydroxyl-terminated polybutadiene homopolymer No. 15 was mixed with 6 parts of tolylene diisocyanate and allowed to cure at room temperature for 2 days in the mold and one week after removal from the mold. The material showed an ultimate tensile strength of 118 psig and ultimate elongation of 186 percent.

EXAMPLE VIII

In another run, 100 parts of styrene copolymer No. 15 was mixed with 7 parts of tolylene diisocyanate and allowed to cure at room temperature for several days. An elastomer showing the following properties was obtained: Ultimate tensile 152 psi, Ultimate Elongation 445 percent, Shore A hardness 36-38.

EXAMPLE IX

In another run, 100 parts of hydroxyl-terminated butadiene-acrylonitrile copolymer No. 15 was admixed with 6 parts of tolylene diisocyanate and the mixture cured at ambient temperature for several days to give an elastomeric product showing good physical properties.

EXAMPLE X

In another run, 83 grams of hydroxyl-containing polybutadiene No. 45 was admixed with 8.3 grams of polypropylene glycol (1,010 molecular weight). The mixture was mixed with 7.7 grams of TDI and 1 gram of tributyltin chloride and allowed to cure at ambient temperature. The resulting elastomer showed the following properties: Ultimate Tensile 118 psi, Ultimate Elongation 700 percent, 100 percent modulus 46, 300 percent modulus 72.2

EXAMPLE XI

A mixture of 100 parts of hydroxyl-terminated polybutadiene homopolymer No. 45 was admixed with 100 parts of MUL F-66. The mixture was allowed to cure at 80° C. for a period of 24 hours and showed good elastomeric properties.

EXAMPLE XII

A typical urea-urethane polymer was prepared using Curithane C-126 (3,3-dichlorobenzidine) as the diamine and diphenyl methane diisocyanate (MDI) as the isocyanate component of the system.

Into a 500 ml. resin kettle was placed 219.7 gm. of the hydroxyl-terminated polybutadiene-acrylonitrile copolymer No. 15, 18.1 grams of Curithane-126 and 0.24 grams of dibutyl tin dilaurate. The mixture was heated to 135° C. in vacuo for one hour and was subsequently cooled to 50° C. Twenty-nine and five-tenths grams of MDI was then added and the mixture stirred rapidly. The mixture became rubberlike immediately upon addition of the MDI and was pressed into a cavity mold and cured for two hours at 125° C. The resulting product showed a tensile strength of about 467 psig, 100 percent modulus 133 psig; 200 percent modulus 217 psig; 300 percent modulus psig; elongation 439 percent; Shore Hardness 49.

So called "two-step" urethane elastomers can be made using the hydroxyl-containing polybutadiene homopolymers and copolymers described above. These elastomers which also are self-curable are prepared adding an excess of tolylene diisocyanate (or other diisocyanate) to the hydroxyl-terminated polybutadiene homopolymer or copolymer to form an isocyanate terminated prepolymer. Or, mixtures of hydroxyl-terminated butadiene homopolymers and copolymers and polyethers (such as poly[oxypropylene] glycol or polytetramethylene glycol) can be made and the mixture reacted with an excess of tolylene diisocyanate or other isocyanate. Similarly, mixtures of hydroxyl-terminated polybutadiene homopolymers and copolymers with hydroxyl-terminated polyesters can be converted to isocyanate-terminated prepolymers by reaction with excess isocyanate. The two-step urethane elastomers may also be made from the pure isocyanate terminated prepolymer of the aforementioned materials which are mixed prior to conversion to elastomeric materials. For example, mixtures of isocyanate-terminated polybutadiene homopolymers and copolymers may be admixed with isocyanate-terminated polyethers and polyesters followed by subsequent reaction to afford the so-called "two-step" urethane elastomer.

EXAMPLE XIII

A variety of isocyanate-terminated prepolymers were prepared from hydroxyl-terminated homopolymers and copolymers of butadiene. Typical, was the preparation of the following. 100 parts of a polybutadiene-styrene copolymer No. 15 were degassed at 110°-120° C. in vacuo to remove traces of moisture or undesired low boiling materials. The polymer was then cooled to room temperature and 32.9 parts of tolylene diisocyanate added rapidly to the stirred mixture using a vapor by-pass dropping funnel. A 30° C. exotherm occurred within 30 minutes after addition of the diisocyanate and the batch required external cooling. The mixture was stirred for at least one hour after the TDI was added and permitted to stand at room temperature for 24 hours. The free-NCO content of the isocyanate-terminated prepolymers was then determined using a standard dibutylamine titration procedure. Theory: 9.00 percent free-NCO. Found: 9.33 percent. This intermediate polymer was reacted with 1,4-butanediol at 80° C. using 0.20 parts of dibutyltindilaurate catalyst per hundred parts of hydroxyl. The glycol was used in a ratio sufficient to supply a ratio of 1.10 isocyanate groups to hydroxyl groups. The cured polymer had an average tensile strength of 1,301 psi, an average tear strength (Graves) of 167 psi, an average ultimate elongation of 244 percent, a Shore hardness of 73 on the A scale, an average 100 percent modulus of 650 psi and an average 200 percent modulus of 1,129 psi.

In like manner, high and low-viscosity hydroxyl-containing butadiene homopolymers and butadiene-acrylonitrile copolymers were reacted with amounts of TDI varying from 21.8 to 34.3 parts per 100 parts hydroxyl polymer to produce intermediate polymers which in turn are reacted with 2-ethyhexanediol-1,3; 2-methyl-2-ethyl-1,3-propanediol; phenyl-1,2-ethanediol; 1,4-butanediol; 3-chloro-1,2-propanediol; thiodiethylene glycol; 1,4-cyclohexane dimethanol; neopentyl glycol; glycol dimercaptoacetate; and polypropylene glycol. All of these two-step urethane polymers were self-curing.

EXAMPLE XIV

In another run, chain-extension of liquid polybutadiene No. 45 polymer was carried out by mixing 100 parts of the polymer with 15 parts of tris-(2-methylaziridinyl)phosphine oxide and about 0.2 percent acetic acid as a catalyst. The mixture was heated at 80° C. for several days, to afford a spongy elastomeric material.

EXAMPLE XV

In another run a self-curing, flame-proof and oil resistant chain-extended elastomer was prepared from chloroprene. In this run a hydroxyl-containing, low molecular weight chloroprene polymer was prepared by polymerizing chloroprene in isopropanol solvent in the following ratio: 100 parts chloroprene, 70 parts isopropanol and 6 parts of 50 percent hydrogen peroxide. This mixture was polymerized at 100°–130° C. for 2–3 hours and the stripped product was a liquid material showing a viscosity of about 500 poises (Brookfield) at ambient temperature. 100 parts of this material was mixed with 8 parts of tolylene diisocyanate and heated at 80° C. overnight to afford a tough, oil-resistant, flame-proof elastomer.

EXAMPLE XVI

In another run a chain-extended isoprene elastomer was prepared by polymerizing isoprene in isopropanol solvent in the following ratio: 100 parts isoprene, 70 parts isopropanol and 10 parts of 50 percent hydrogen peroxide. The mixture was charged to an autoclave and heated at 118° C. for 2–3 hours to afford a chain-extendable polyisoprene having about 2.5 hydroxyl groups per molecule showing a viscosity of about 60 poises (Brookfield) at ambient temperature. 100 parts of this polymer and 8 parts of tolylene diisocyanate were mixed and allowed to cure in an inert atmosphere for 48 hours to afford a resilient elastomer gum stock. When this material is milled for 12 hours with exposure to the air it gradually becomes increasingly difficult to work, showing further self-curing.

EXAMPLE XVII

In another run an interpolymer of butadiene, styrene and acrylonitrile was prepared by copolymerizing the monomers in isopropanol solvent in the following ratio: 65 parts butadiene, 25 parts styrene, 10 parts acrylonitrile, 70 parts isopropanol and 6 parts of 50 percent hydrogen peroxide. The resulting mixture was heated in a stirred autoclave at 118° C. for 2–3 hours to form a chain-extendable interpolymer of butadiene, styrene and acrylonitrile, which could be varied in Brookfield viscosity fro about 200–4,500 poises by varying temperature, reaction time and catalyst concentration. Portions of the above hydroxyl-containing interpolymers of butadiene-styrene-acrylonitrile were mixed with from 5–10 parts of tolylene diisocyanate to form elastomeric materials, varying in degrees of hardness and resilience with the reaction temperature used and the degree of milling.

EXAMPLE XVIII

In another run a copolymer of butadiene and acrylamide was prepared by polymerizing the monomers in isopropanol solution in the following ratio: 80 parts butadiene, 20 parts acrylamide, 70 parts isopropanol and 6 parts of 50 percent aqueous hydrogen peroxide. The mixture was heated at 118° C. for 2–3 hours to afford a low molecular weight chain-extendable copolymer of butadiene and acrylamide showing a Brookfield viscosity of about 500–1,000 poises at 30°from C. Portions of this material were mixed with increasing quantities of tolylene diisocyanate, e.g., from 5–15 percent and heated to afford a series of elastomer products which showed good resilience and toughness.

The copolymers of butadiene and acrylamide are particularly suitable for chain-extension with formaldehyde, phenol-formaldehyde, melamine formaldehyde and urea formaldehyde compositions, to give chain extendable self-curing polymers. Polymers of this type were prepared by reacting 100 parts of the butadiene-acrylamide low molecular weight hydroxyl-containing copolymer described above with from 1 to 10 parts of formaldehyde in the presence of 0.1 part of phosphoric acid, to afford elastomeric materials.

EXAMPLE XIX

Formaldehyde was also found to be particularly suitable for chain-extending the hydroxyl-containing butadiene polymers. In one example, 100 parts of polybutadiene polymer No. 15 was reacted with about 5 parts of formaldehyde at about 100° C. The resulting product was a chain-extended self-curing elastomer. Sulfuric acid was employed in catalytic amounts in this run.

EXAMPLE XX

In another run, 100 parts of polybutadiene No. 45 was mixed with 25 parts of Epon 828 diepoxide, having the structural formula

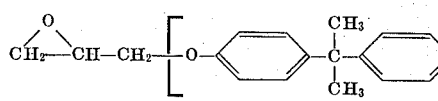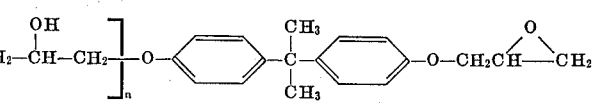

a viscosity (Gardner Holdt) of 100–160 poises, an epoxide equivalent of 180–195 and an equivalent weight of 85, in the presence of an alkaline catalyst, and heated at 80° C. for 24 hours, whereupon an elastomeric material was formed. Further heating caused self-curing. Acidic catalysts such as phosphoric acid, acetic acid, trichloracetic acid, sulfuric acid, xylene sulfonic acids are also useful for chain-extension with diepoxide as well as alkaline catalysts such as potassium t-butoxide, lithium hydride and lithium metal in amounts of about 0.1 to 2 percent by weight.

EXAMPLE XXI

In another run polybutadiene No. 45 was hydrogenated with

Raney Nickel catalyst at 75°–100° C. and 100–900 psig hydrogen pressure, in tetrahydrofuran. The resulting hydroxyl-containing polymer was shown to be about 80 percent hydrogenated by nuclear magnetic resonance analysis. 100 parts of this wax-like, solid, hydrogenated polybutadiene was admixed with 7 parts of tolylene diisocyanate and heated in an inert atmosphere for 48 hours at 80° C., whereupon a tough, resilient elastomer showing improved oxidation stability and oxone resistance was obtained.

The above illustrations show the production of polyolefin-polyurethane, polyolefin-polyether-polyurethane, polyolefin-polyester-polyurethanes and polyolefin-polyester-polyether polyurethane rubbers by use of liquid or semi-solid polydienes having terminal allylic hydroxyl groups on their main hydrocarbon chain. Styrene-butadiene-polyether-urethane rubbers, styrene-butadiene-polyester-urethane rubbers or styrene-butadiene-polyether-polyester-urethane rubbers can be manufactured from a first intermediate polymer containing styrene and butadiene residues.

When low molecular weight hydroxyl-containing butadiene-acrylonitrile copolymers are reacted with tolylene diisocyanate or other chain-extending agents, one can obtain a diene-nitrile-urethane rubber showing exceptionally outstanding resistance to gasoline, grease and organic solvents. These materials are similar to Buna-N, GR-A, GR-N or conventional types of nitrile rubber, but have the advantage of being castable as self-curing liquids. The acrylonitrile-polybutadiene-urethane rubbers of the present invention are useful as coatings for pipelines, fuel tanks, and in other applications where highly oil resistant and solvent resistant elastomers are required.

It is claimed:

1. A self-curing, solid elastomer comprising the polymer of an intermediate polyhydroxyl polymer, chain extended by reaction with a polyfunctional compound reactive with hydroxyl groups, said intermediate polymer having an average of at least 2.1 predominantly primary, terminal allylic hydroxyls per molecule and being an addition polymer of 0–75 percent by weight of an alpha-monoolefinically unsaturated monomer of two to 12 carbon atoms, and the balance consisting essentially of a 1,3-diene hydrocarbon of four to about 12 carbon atoms, said intermediate polymer having the majority of its unsaturation in the main hydrocarbon chain, a Brookfield viscosity at 30° C. of about 5–20,000 poises, a number average molecular weight of about 400 to 25,000 and being made by hydrogen peroxide catalyzed, free-radical polymerization at a temperature of about 100° to 200° C.

2. The elastomer of claim 1 in which the 1,3-diene is butadiene.

3. The elastomer of claim 2 in which the alpha-monoolefinically unsaturated monomer is acrylonitrile.

4. The elastomer of claim 1 in which the 1,3-diene is isoprene.

5. The elastomer of claim 1 in which the alpha-monoolefinically unsaturated monomer is about 10 to 40 percent by weight of the addition polymer.

6. The elastomer of claim 5 in which the alpha-monoolefinically unsaturated monomer is styrene.

7. The elastomer of claim 1 in which the intermediate polymer has about 40–70% trans-1,4-unsaturation and about 10–30% cis-1,4-unsaturation.

8. The elastomer of claim 7 in which the intermediate polyhydroxyl polymer has about 50–65% trans-1,4-unsaturation and about 15–25% cis-1,4-unsaturation.

9. The elastomer of claim 7 in which the intermediate polymer has a Brookfield viscosity of about 20–500 poises at 30° C.

10. The elastomer of claim 7 in which the intermediate polymer has about 2.2 to 2.6 of said hydroxyls per molecule.

11. The elastomer of claim 1 in which the polyfunctional compound is a diisocyanate.

12. The elastomer of claim 10 in which the polyfunctional compound is a diisocyanate.

13. The elastomer of claim 7 in which the polyfunctional compound is a diisocyanate.

14. The elastomer of claim 11 in which the diisocyanate is tolylene diisocyanate.

15. The elastomer of claim 12 in which the diisocyanate is tolylene diisocyanate.

16. The elastomer of claim 13 in which the diisocyanate is tolylene diisocyanate and the 1,3-diene is butadiene.

17. The elastomer of claim 1 in which the amounts of intermediate polyhydroxy polymer and polyfunctional compound provide about 0.5 to 3 hydroxyl-reactive functional groups of the polyfunctional compound per hydroxyl group of the intermediate polyhydroxyl polymer.

18. The elastomer of claim 11 in which the amounts of intermediate polyhydroxy polymer and polyfunctional compound provide about 0.5 to 3 hydroxyl-reactive functional groups of the polyfunctional compound per hydroxyl group of the intermediate polyhydroxyl polymer.

19. The elastomer of claim 18 in which the diisocyanate is tolylene diisocyanate and the 1,3-diene is butadiene.

20. The elastomer of claim 7 in which the polyfunctional compound reactive with hydroxyl groups is diisocyanate and the elastomer is chain extended with diamine.

21. The elastomer of claim 7 in which the polyfunctional compound is an azridinyl phosphine oxide.

22. The elastomer of claim 7 in which the polyfunctional compound is formaldehyde.

23. The elastomer of claim 7 in which the polyfunctional compound is a diepoxide.

24. The elastomer of claim 1 in which the polyfunctional compound reactive with hydroxyl groups is diisocyanate and the elastomer is chain extended with diamine.

25. The elastomer of claim 24 in which the diisocyanate is tolylene diisocyanate and the 1,3-diene is butadiene.

26. The elastomer of claim 1 in which the intermediate polymer is partially hydrogenated.

* * * * *